United States Patent [19]

Bailey

[11] 4,273,427

[45] Jun. 16, 1981

[54] APPARATUS FOR STORING AND RANDOMLY ACCESSING PLANAR FILM RECORDS

[75] Inventor: David C. Bailey, Cocoa Beach, Fla.

[73] Assignee: Harris Corporation, Cleveland, Ohio

[21] Appl. No.: 923,182

[22] Filed: Jul. 10, 1978

[51] Int. Cl.³ ............................................. G03B 23/08
[52] U.S. Cl. .................................................. 353/27 A
[58] Field of Search ................ 353/25 R, 27 R, 27 A, 353/118; 209/569, 583; 40/510, 513; 360/88

[56] References Cited

U.S. PATENT DOCUMENTS

| | | | |
|---|---|---|---|
| 2,940,068 | 6/1960 | Stiefel | 360/88 X |
| 3,055,522 | 9/1962 | Cronquist | 353/25 X |
| 3,124,260 | 3/1964 | Tidball | 353/25 X |
| 3,126,008 | 3/1964 | Geddes | 209/617 X |
| 3,204,522 | 9/1965 | Wadsworth | 353/117 |
| 3,243,780 | 3/1966 | Bendick et al. | 353/25 |
| 3,266,377 | 8/1966 | Panissidi | 91/167 |
| 3,296,727 | 1/1967 | Liguori | 235/25 |
| 3,299,554 | 1/1967 | Leaver | 353/25 |
| 3,422,538 | 1/1969 | Panissidi | 33/26 |
| 3,429,436 | 2/1969 | Irasek | 209/909 X |
| 3,456,817 | 7/1969 | Irazoqui | 214/16.4 |
| 3,528,735 | 9/1970 | Bluitt et al. | 353/27 A |
| 3,652,155 | 3/1972 | Scheibel | 353/25 |
| 3,704,451 | 11/1972 | Pearson | 353/25 X |
| 3,747,754 | 7/1973 | Nix et al. | 209/608 |
| 3,800,942 | 4/1974 | Hirata | 353/25 |
| 3,834,799 | 9/1974 | Blosser et al. | 353/27 A |
| 3,883,239 | 5/1975 | Besancenot | 353/118 |
| 3,930,992 | 1/1976 | Baumel et al. | 209/552 |
| 3,968,878 | 7/1976 | Winkler et al. | 353/117 X |
| 4,025,176 | 5/1977 | Lopata | 353/26 A |
| 4,155,842 | 5/1979 | Wallace et al. | 209/583 X |

*Primary Examiner*—Harry N. Haroian
*Attorney, Agent, or Firm*—Yount & Tarolli

[57] ABSTRACT

A system (10) is disclosed for storing and selectively retrieving planar film records, such as microfiche (25). The microfiche are stored in a carousel assembly (12) and are retrieved from the carousel by a positioning assembly (18). The carousel assembly (12) includes several carousels (22, 24), each defined by two slot plates (26, 30; 28, 32). The slot plates have a plurality of slots (37) formed therein, and the microfiche are held by their edges in these slots. Each microfiche is stored in a known slot location in the carousel, and is retrieved through reference to this slot location. The positioning assembly (18) moves an extractor head (16) in two dimensions for retrieval and reading of the microfiche. Movement in both dimensions is entirely accomplished by binary linear actuators (FIG. 6).

10 Claims, 9 Drawing Figures

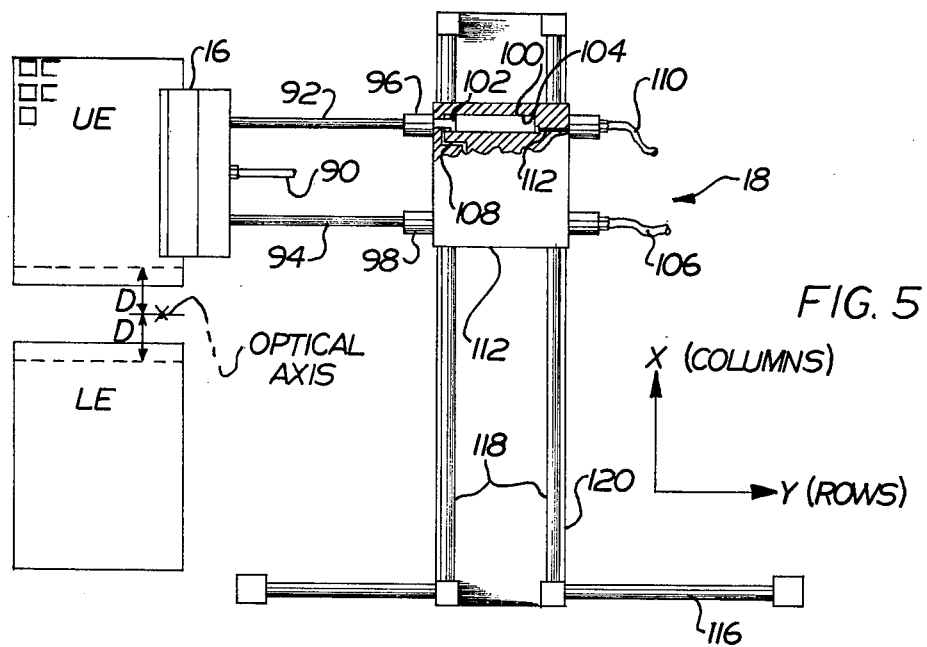
FIG. 5
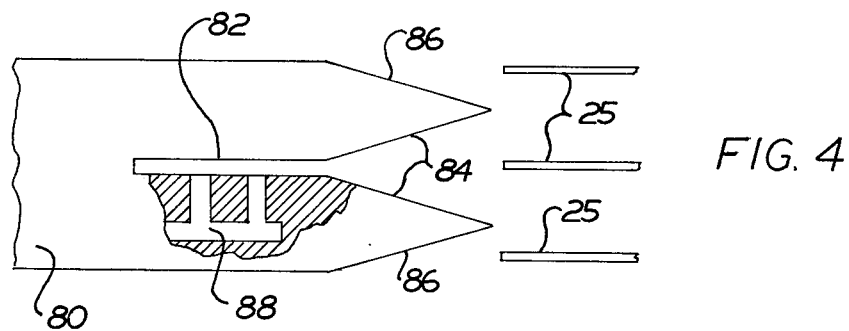
FIG. 4
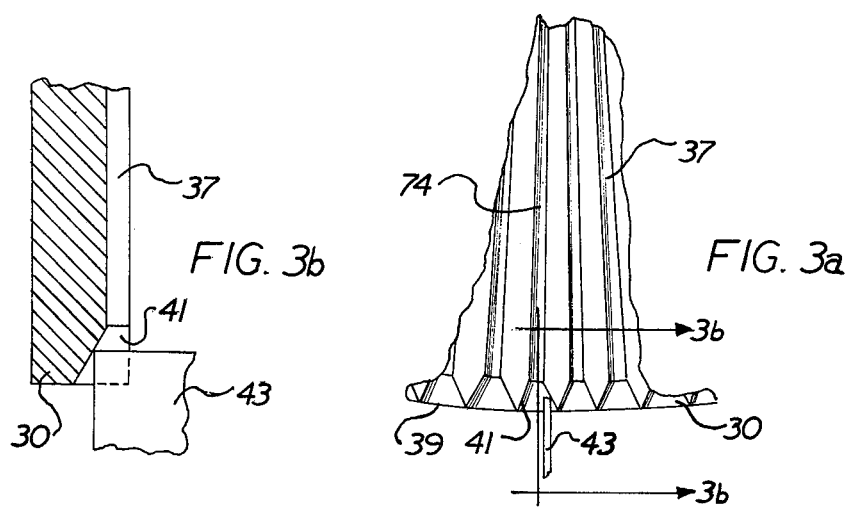
FIG. 3b
FIG. 3a

APPARATUS FOR STORING AND RANDOMLY ACCESSING PLANAR FILM RECORDS

BACKGROUND AND FIELD OF THE INVENTION

The present invention relates to information retrieval systems, and more particularly to a system for storing and selectively retrieving planar film records, wherein the film records may be accessed without reference to any data contained on the microfiche.

Microfiche storage and retrieval systems have been developed in response to the growing need for information storage systems which are compact, and yet provide rapid and efficient access to large volumes of information. In order to provide rapid access of the information contained on the microfiche, some means must be provided for automatically identifying a particular microfiche, without having to actually view the information contained thereon. In the past, various systems have been employed which met this requirement by including unique identification coding along one edge of each of the microfiche. This was implemented by either providing notches along that edge of the microfiche or else by providing a magnetic strip containing the code in a magnetic pattern recorded thereon. The particular microfiche could thus be identified through reference to this coded data.

SUMMARY OF THE INVENTION

The present invention provides a storage and retrieval system for such planar film records as microfiche, which permits random accessing of a plurality of microfiche stored in a storage device without use of or reference to identification codes such as have been used in the past. The need for providing these codes is therefore eliminated, thus reducing the cost of implementing the system. This also permits the use of any standard microfiche with the system, without special handling, and allows the microfiche which have already been used in the system to be removed at any time for use in other equipment, not designed for use with coded microfiche.

This is accomplished, in accordance with the teachings of the present invention, by locating the film records in specific, known locations within a film record storage unit. As described hereinafter this storage unit incorporates a number of constructional features which permit the storage of a large number of film records in a close, side-by-side relationship. Other constructional features of the system with which the storage unit is utilized enable efficient and rapid accessing of the film records contained within the storage device.

It is therefore an object of the present invention to provide a system for storing and selectively retrieving a plurality of film records, without use of edge codes, such as have been utilized in the past.

It is another object of the present invention to provide a system including a storage unit for storing a plurality of planar film records, wherein the film records are located in specific locations within the storage unit, and wherein they are identified upon the basis of their location, rather than on the basis of any identification code contained thereon.

It is still another object of the present invention to provide a system wherein the storage unit is constructed to permit storage of a large number of planar film records in a close, side-by-side relationship so as to provide a compact mass information storage system.

It is yet another object of the present invention to provide a system employing a unique extractor/positioner mechanism which permits rapid and accurate positioning of the microfiche.

It is a more specific object of the present invention to provide an extractor/positioner which utilizes a plurality of binary (two position) linear actuators to perform all of the positioning functions required of the extractor/positioner.

Therefore, in accordance with one aspect of the present invention, an apparatus is disclosed for the storage and selective retrieval of a plurality of planar film records. This apparatus includes a storage unit for storing the planar film records in a close, side-by-side relationship in corresponding known locations in the storage unit. The storage unit includes means for confining the film records in specific locations by restraining two opposing edges of the film records from movement in at least the direction normal to the plane of the film record. A film record retrieval device retrieves a selected film record from the storage unit by grasping the selected film record by an edge other than the two opposing edges, and by then withdrawing the film record from the storage unit. A control circuit is provided to cause the retrieval device to retrieve a selected film record from the storage unit by causing the retrieval device to retrieve the film record from the location in the storage unit in which the film record is known to be stored, without first referring to any data contained on the film record. The film records are thus retrieved by reference to their locations in the record storage device, rather than by reference to any data contained on the film record.

In accordance with another aspect of the present invention, the film record retrieval device includes an extractor head, an X positioner for positioning the extractor head at predetermined positions in a first dimension, and a Y positioner for positioning the extractor head at predetermined positions in a second dimension. These two positioners each include a plurality of binary linear actuators for providing a corresponding precision, predetermined amount of travel in the corresponding direction, with the entire positioning of the extractor head in the first and second dimensions being accomplished by controlling the operation of the linear actuators.

BRIEF DESCRIPTION OF THE DRAWINGS

The foregoing and other objects and advantages of the present invention will become more readily apparent from the following description of a preferred embodiment, as taken in conjunction with the accompanying drawings, wherein:

FIGS. 3a and 3b are detailed illustrations of one of the slot plates of the carousel assembly of FIG. 2;

FIG. 4 is an illustration of the leading edge of the extractor head of the system of FIG. 1, shown partly in section;

FIG. 5 is an elevational view of the extractor/positioner mechanism of the system of FIG. 1;

DETAILED DESCRIPTION

Figure 1:
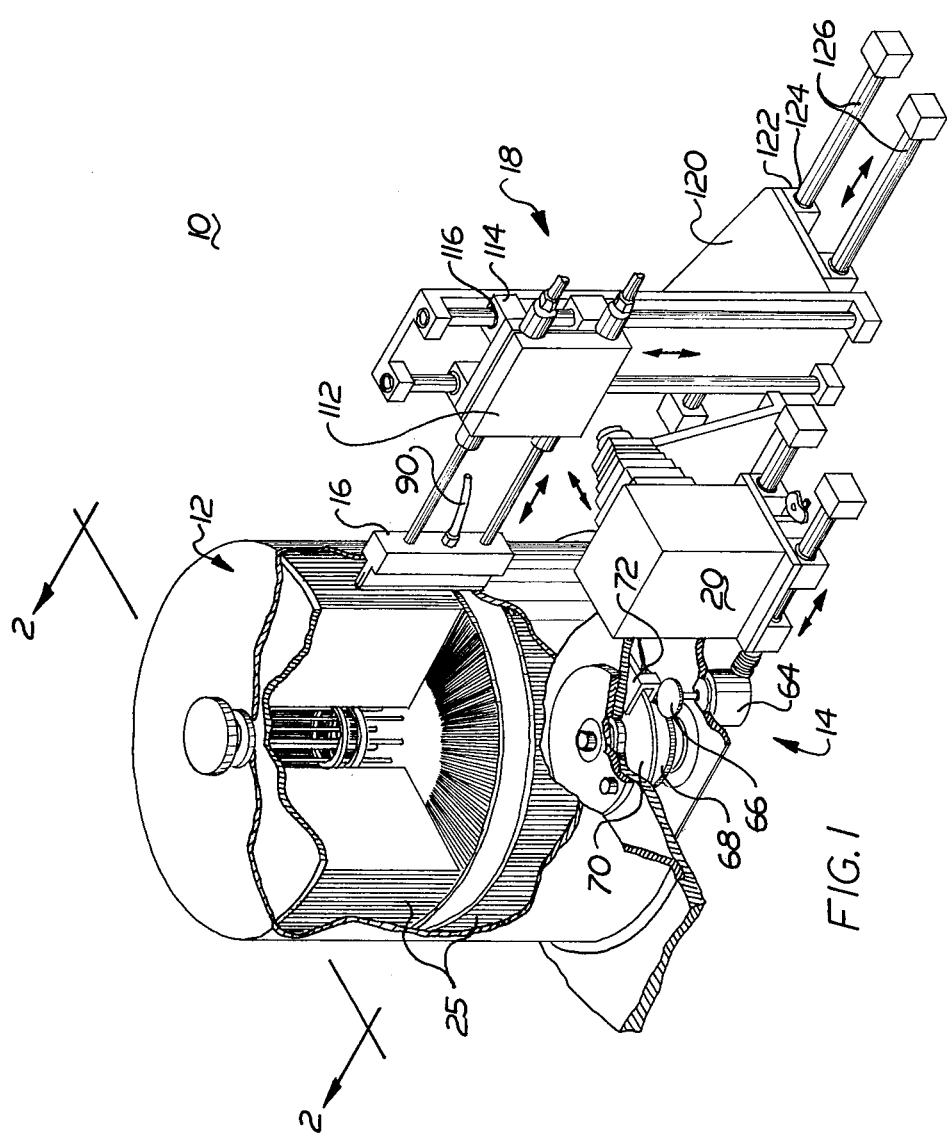
FIG. 1 is a perspective drawing, partly in section, of a microfiche storage and retrieval system constructed in accordance with the teachings of the present invention.

There is illustrated in FIG. 1 a microfiche storage and retrieval system in accordance with the teachings of the present invention. This system generally includes a carousel 12 for storing the microfiche, a carousel drive 14 for rotating the carousel so that the proper microfiche is adjacent to an extractor head 16, and an X/Y positioning mechanism 18 which positions the extracted microfiche with respect to an optical axis defined by a microfiche reader assembly 20.

Figure 2:
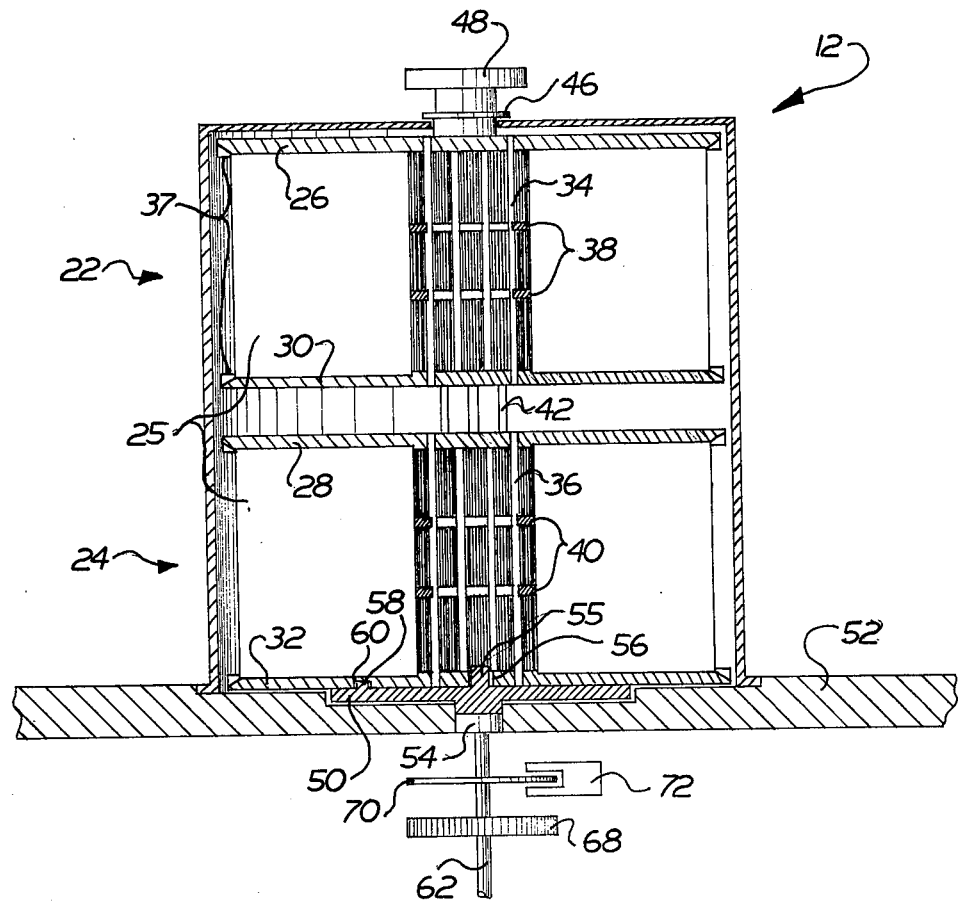
FIG. 2 is a sectional view of the microfiche storage carousel assembly of the system of FIG. 1.

The carousel assembly 12 (see FIG. 2) includes two essentially identical carousels 22 and 24 in which a plurality of microfiche 25 are stored. These carousels each include a corresponding upper slot plate 26, 28 and a corresponding lower slot plate 30, 32. The upper and lower slot plates of each carousel are circular, and are held in a parallel, coaxial relationship by a corresponding set of six spacer rods 34, 36. These six spacer rods are in each case located at the same radial distance from the central axis of the slot plates, and are equally spaced around the axis.

The facing sides of the slot plates of each carousel have a large number of radially extending slots 37 formed therein. As can best be seen in FIGS. 3a and 3b, which are detail drawings of the slot plate 30, these slots 37 are open at the perimeter 39 of the plate to permit the edge of a microfiche to be inserted therein. The spacing between the slot plates is such that a microfiche, when inserted so that its opposing edges are received in corresponding slots in the upper and lower slot plates, will be restrained from movement in a direction normal to the plane of the microfiche. This permits a large number of microfiche to be stored in the carousel in a close side-by-side relationship.

The slots 37 each have a beveled extranceway 41 in order to permit the microfiche to be entered into the carousel assembly 12 without requiring exact positioning thereof. The entranceway 41 is beveled not only in the plane of the slot plate 30, but also in the plane of the microfiche 43. The microfiche 43 may be thus slightly skewed upon insertion into the carousel, and will be guided into the proper slot 37 by means of the beveled entranceway 41.

In each carousel, two rings 38, 40 are supported between the slot plates by notches provided in the spacer rods 34, 36. The purpose of these rings is to provide a back stop against which the microfiche may be pressed during the microfiche extraction process. This will be more fully explained hereinafter.

The two carousels 22 and 24 are coaxially supported one above the other by another set of six spacer rods 42. These rods are located at the same radial distance from the carousel axis as the spacer rods 34, 36, but are angularly rotated with respect to those rods so that there is no interference between them.

A generally cylindrical dust cover 44 encases the carousel assembly. The carousel assembly is freely movable relative to the dust cover 44, but is held in place by means of a circular flange member 46, attached to the upper slot plate 26 of the upper carousel 22. A knob 48 is carried on the flange member 46 so that an operator may transport the carousel assembly from place to place, as a unit. The dust cover 44 has openings therein (not shown) adjacent the upper and lower carousels in order to permit microfiche to be extracted from and inserted into the carousel. When properly mounted over the carousel drive 14, the dust cover 44 will be oriented so these access holes are located substantially adjacent the extractor head 16.

When constructed and assembled in this manner, the upper and lower carousels 22 and 24 are rigidly joined and may be rotated as a single unit, independently of the dust cover. Carousel drive assembly 14 is provided for this purpose, and includes a drive plate 50 which is rotatably mounted on the base 52 by means of bearings 54. The drive plate 50 includes a centrally located pin 55 which is adapted to fit into a correspondingly shaped opening 56 in lower slot plate 32 of the lower carousel 24. The drive plate 50 also includes a positioning key 58 which will be received by a correspondingly shaped notch 60 in the slot plate 32 when the carousel assembly is properly oriented (rotationally) relative to the drive plate 50. In the illustrated embodiment, carousel assembly 12 is simply placed in position over the drive plate by the operator, and is held in place thereafter by gravity. If desired, however, the carousel assembly may be more firmly attached to the drive plate or supported by bearings in any convenient manner.

The drive plate 50, and thus the carousels 22, 24, is rotated by means of a shaft 62 which passes through bearings 54 and is rigidly attached to drive plate 50. A stepping motor 64 rotates the shaft 62 on the bearings 54 by means of gears 66, 68. The gearing is such that the carousels 22, 24 will rotate by one slot position for each step of stepping motor 64.

Alternatively, the carousels 22, 24 could be rotated by directly driving the peripheral edge of slot plate 32. In this event, the beveled entranceways 41 of the microfiche slots could serve as gear teeth, and would mesh with the gear associated with the stepping motor.

The carousel drive assembly also includes an encoder wheel 70 which operates in conjunction with detector 72 to sense the rotational position of the microfiche carousels. Although this encoder wheel may be adapted to provide coded words identifying each slot position of the carousels, it is presently preferred that this will instead contain only a single mark indicating a reference position of the carousels. After sensing this reference mark, then, the control circuitry will keep track of the rotational position of the carousels by counting the number of pulses which have been applied to the stepping motor 64.

The microfiche stored in the carousel assembly will be extracted and positioned by means of the extractor head 16, carried by the X-Y positioner assembly 18. In the embodiment presently being described, this extractor head is vacuum operated, and includes no moving parts. As can be seen more particularly in FIG. 4, which is a top view of the extractor head 16, the leading portion 80 of the head has a slot 82 therein, generally aligned with the edges of the microfiche 25. The selected microfiche is guided into slot 82 by means of two beveled surfaces 84. The exterior surfaces 86 are also beveled so as to flex the unselected adjacent microfiche away from the selected microfiche. This is necessary since the spacing between adjacent microfiche in carousel assembly 12 is so small that these adjacent microfiche would interfere with the operation of the extractor head, if not separated in this manner.

The extractor head includes passages 88 leading from a vacuum line 90 to an interior surface of slot 82. Upon the selected microfiche being fully received within slot 82, a vacuum will be applied to passages 88 via the vacuum line 90. Atmospheric pressure will thus firmly press the selected microfiche against the passages 88 within the slot 82. The microfiche is thus held within slot 82, and may then be withdrawn from the carousel assembly, and positively positioned relative to the microfiche reader assembly 20.

Positioning of extractor head 16 for the extraction and insertion of microfiche is accomplished by two rods 92 and 94. These rods are connected to the pistons of dual-acting pneumatic actuators through sleeves 96 and 98. Since these actuators are essentially identical, only the actuator associated with rod 92 is shown. This actuator 100 includes a piston 102 located within a correspondingly shaped cylinder 104. The chamber to the leftward end of piston 102 (as viewed in FIG. 5) is connected to a pressure line 106 via a passage 108, while the chamber to the rightward end of the piston 102 is connected to a pressure line 110 via a passage 112. The leftward and rightward chambers in the cylinder of the actuator associated with rod 94 will similarly be connected to pressure lines 106 and 110, respectively. Consequently, when pressure is applied to pressure line 106, and pressure line 110 is exhausted to the surrounding atmosphere, the pistons 102 will retract within chamber 104, causing the extractor head to be pulled away from carousel assembly 12. Similarly, the extractor head 16 may be reinserted into the carousel 12 by applying a pressure to pressure line 110 and exhausting pressure line 106 to the surrounding air.

These pneumatic actuators are formed within a carriage 112 having blocks 114 located at the four corners thereof (see FIG. 1). These blocks carry linear bearings 116 which are adapted to receive two rails 118 therethrough. These rails are oriented parallel to one another, and form the X axis of the positioner assembly 18. Rails 118 are mounted onto a casting 120. This casting 120 similarly has four blocks 122 associated with the four corners of the bottom surface thereof. These blocks also include linear bearings 124 which receive rails 126 therethrough. These rails, which are again oriented parallel to one another, represent the Y axis of the positioner assembly 18. Further, rails 126 are oriented substantially perpendicularly with respect to rails 118. Positioning of carriage 112 along two orthogonal axes may thus be accomplished.

The carriage 112 is positioned along the rails 118 by a means of a number of two-position (i.e. binary) linear actuators (not shown in FIGS. 1-5). Similarly, the casting 120 is positioned along rails 126 by means of a number of binary linear actuators. These actuators will be better shown and described with reference to FIG. 6.

During a microfiche extraction or insertion cycle, the casting 120 will be positioned to the far leftward extent of its travel (as viewed in FIG. 5) permitted by its actuators. The position of the carriage 112 along rails 118, however, will depend upon whether the microfiche of interest is located within the upper or lower carousel 22 or 24. From these positions, the microfiche will be inserted or extracted through the operation of the two actuators carried by the carriage 112. The length of travel of these actuators is carefully selected to be somewhat greater than the distance to the selected microfiche. The selected microfiche will thus be forced against the rings 38,40, and will flex slightly between these rings and the extractor head 16. The edge of the selected microfiche will thus be forced into close alignment with the back edge of the slot 82. This is an important feature since it insures that the microfiche will always be in a specific orientation on the extractor head. If this were not the case, then accurate X-Y positioning would be much more difficult.

During the reading of a microfiche, the linear actuators which perform the positioning of the microfiche in the X and Y directions must operate to position the microfiche at a plurality of discrete positions defined by the position of the various images on the microfiche. As can be seen in FIG. 5, these images are arranged in ordered rows and columns. In the preferred embodiment, standard 24× NMA microfiche are used; each of these microfiche includes 98 images arranged in seven rows of fourteen columns each.

Figure 6:
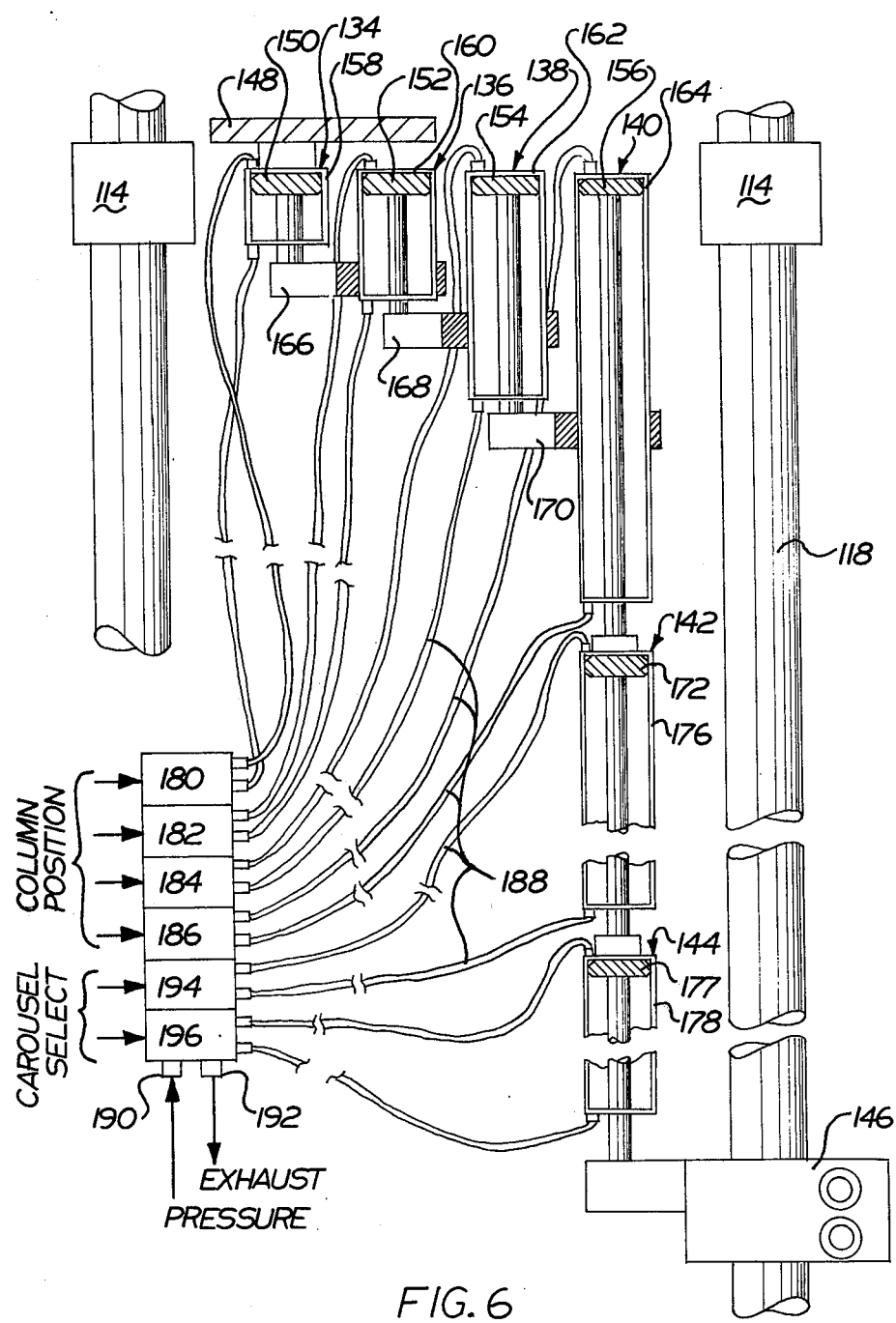
FIG. 6 is an elevational view, partly in section, of the linear actuators utilized to position the extractor head in the X dimension.

The mechanism utilized to position the carriage 112 in the X direction is illustrated in FIG. 6. In this figure it will be seen that six pneumatic actuators 134, 136, 138, 140, 142, and 144 are used to provide the necessary positioning. These pneumatic actuators are connected together in a series arrangement so that their effect is additive, and controls the linear extension between a clamp 146 attached to rail 118, and a member 148 which is attached in any convenient manner to the carriage 112. These actuators are all dual-acting pneumatic actuators, and are characterized as "binary" actuators since they are operated between only two positions: fully extended and fully retracted.

Pneumatic actuators 134, 136, 138, and 140 are used to position the microfiche into one of fourteen positions, corresponding to the fourteen column positions on the microfiche, relative to an optical axis. This optical axis defines the position in space from which information is read by the microfiche reader 20. As can best be seen in FIG. 5, this optical axis is located midway between carousels 22 ans 24.

Actuators 142 and 144 are utilized to move the microfiche between reading and extraction positions. The selected microfiche will be properly oriented relative to the optical axis (for reading of the microfiche) when one but not both of the actuators 142, 144 is extended. The selected of a particular image for viewing is then accomplished through use of actuators 134-140.

As can be seen in FIG. 6, each of the actuators 134, 136, 138, and 140 includes a corresponding piston 150, 152, 154, and 156 slidably received within the corresponding cylinder 158, 160, 162 and 164. The length of travel of actuators 134, 136, 138, and 140 are selected to be progressively larger in a binary progression (i.e. 1, 2, 4, and 8). Actuator 134 is designed to have a cylinder 158 which permits a precision travel of one image position in the X direction. The length of cylinder 160, on the otherhand, permits a precision travel of piston 152 of two image positions. Similarly, piston 154 travels within cylinder 162 to an extent of four image positions, whereas cylinder 164 permits piston 156 to travel eight image positions. Furthermore, each actuator is coupled to the next succeedingly larger actuator so that the effect of their extensions is additive. Thus, piston 150 of actuator 134 is coupled to the cylinder 160 of actuator 136 through a clamp 166. Similarly, the piston 152 of actuator 136 is connected to the cylinder of actuator 138 through a clamp 168, and the piston 154 of actuator 138 is connected to the cylinder 164 of actuator 140 through a clamp 170.

The selection of any of the fourteen image position along the microfiche in the X direction may be accomplished by controlling the extended/retracted conditions of these four cylinders 134, 136, 138, 140. Thus, if the first column of images is to be positioned on the optical axis, then all of these four actuators must be fully retracted. If the second column of images is to be positioned on the optical axis, then only actuator 134 will be extended, etc. If the tenth column is to be positioned on the optical axis, then actuators 134 and 140 will be extended, providing a displacement of nine image columns (8+1) from the first column, etc.

Each of these four actuators 134–140 is controlled by a corresponding two way valve 180, 182, 184, and 186. Each valve is electrically controlled, and connects the pressure lines 188 of the corresponding actuator to pressure and exhaust lines 190, 192 in such a manner as to obtain the extension or retraction of that actuator. When an electrical signal corresponding to a binary "1" is sent to one of valves 180–186, that valve will move to a position wherein air under pressure is fed to the chamber above (as viewed in FIG. 6) the corresponding piston, and the chamber below the piston will be connected to the exhaust line 192. The actuator will thus extend. When a binary "0" electrical signal is instead supplied to the valve, these connections will be reversed so that the actuator will retract. Any of the fourteen column positions may therefore be selected by supplying an appropriate binary "word" to the inputs of valves 180–186.

As stated previously, two other actuators 142 and 144 are provided in order to move the microfiche between extraction and reading positions. Each of these actuators is constructed in the same manner as actuators 134–140. Thus, actuators 142 and 144 respectively include pistons 172 and 174, and cylinders 176 and 178. Actuators 140, 142 and 144 are, in the example presently being described, connected in such a fashion as to have a common line of action. In other words, the piston 156 of actuator 140 is coupled directly to the cylinder 176 of actuator 142, and the piston 172 of actuator 142 is similarly coupled to the cylinder 178 of actuator 144. As can be seen in FIG. 6, the piston 174 of actuator 144 is directly coupled to the clamp 146.

When the extractor head 16 is to be positioned for extraction of a microfiche from the upper carousel (position UE, see FIG. 5), actuators 134–140 will be in the positions representing the last (fourteenth) column, and both of actuators 142, 144 will be extended. When the extractor head 16 is to be positioned for extraction of a microfiche from the lower carousel of the carousel assembly (position LE, see FIG. 5), however, actuators 134–140 will be in the positions representing the first column, and both of actuators 142, 144 will be retracted. When the microfiche is being read, one of actuators 142 and 144 (which have identical travel lengths) will be extended, and actuators 134–140 will be in the positions necessary to locate the selected column at the positions necessary to locate the selected column at the optical axis. To provide this operation, each of these actuators 142 and 144 will be constructed to have a length of travel D corresponding to the distance between the optical axis and the center line of the closest column position of the microfiche, when in an extraction position. These actuators 142, 144 are controlled by valves 194, 196 in the same manner as described previously with respect to valves 180–186.

The actuator assembly utilized to position casting 120 along the rails 116 is essentially identical to that shown and described with respect to FIG. 6, except that only three actuators will be required, since only seven rows are present in the standard 24× NMA microfiche. These three actuators will be connected to one another in the same fashion that actuators 134, 136 and 138 are coupled to one another. The piston of the largest actuator will, however, be coupled directly to a clamp associated with the rail 116, whereas the cylinder of the smallest actuator will be connected in any convenient fashion to the casting 120. Operation of these actuators will again be controlled through use of two way valves similar to the valves shown and described in FIG. 6.

It will thus be seen that positioning in two dimensions is entirely accomplished through use of binary linear actuators. These actuators can be precision manufactured so that the relative positioning provided by the actuators will be essentially exact. Offset in the absolute position of the carriage 112 may exist, but this can be effectively removed by simply readjusting the points along rails 118, 126 at which the clamps of the positioners are attached. Only two adjustments are therefore required in order to completely adjust the positioner assembly.

Figure 7:
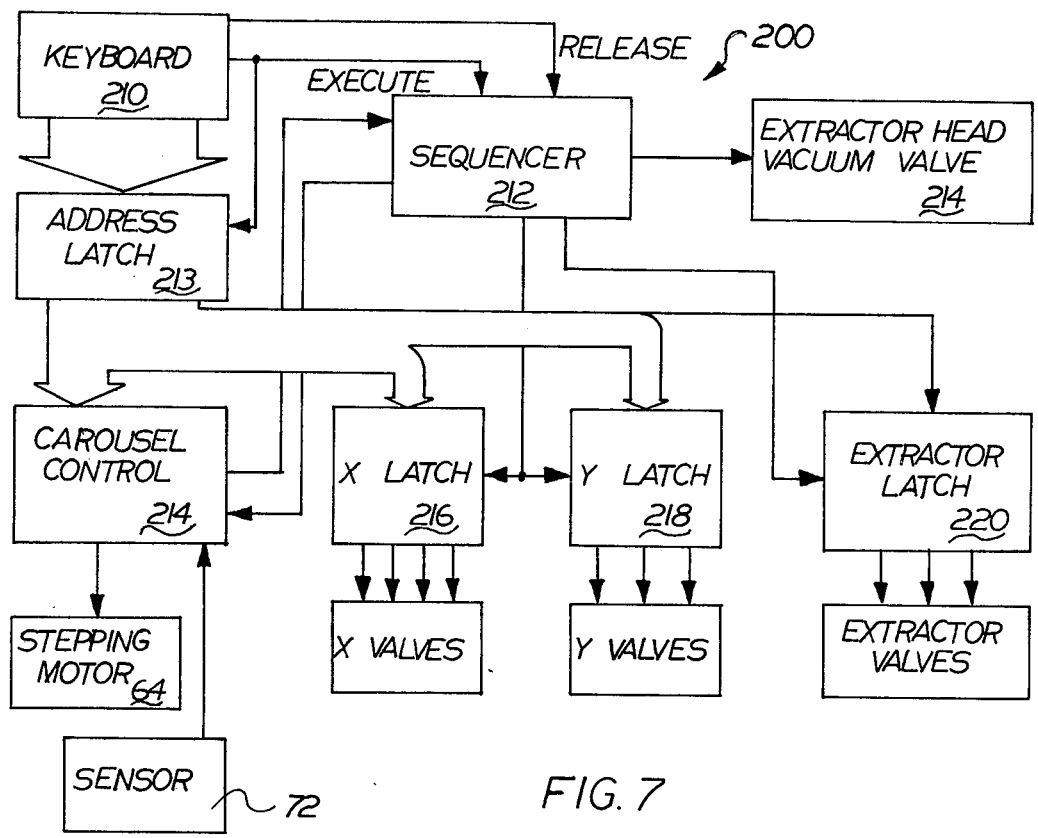
FIG. 7 is a broad block diagram of the control system utilized to control the apparatus illustrated in FIGS. 1-6; and, FIG. 8 is a more detailed illustration of one of the blocks of the control circuit of FIG. 7.

The circuitry which is utilized to control the mechanism is illustrated in broad form in FIG. 7. It will be appreciated that this control system may take many different forms, and the one illustrated in FIG. 7 is intended to be merely representative of one form which this control system could take. In FIG. 7, the control system 200 includes a keyboard 210 by which an operator may enter information corresponding to the address of a particular piece of information which is to be retrieved. This information may be derived, for example, from an index which cross references particular pieces of information and their location within the carousel assembly 12. The operator will then press an execute button which will trigger the operation of a sequencer 212. This also loads the address into an address latch 213. Sequencer 212 then provides control signals to the remainder of the system in order to cause it to sequence through the proper operations. Thus, sequencer 212 will first provide a start signal to a carousel control circuit 214 in order to cause it to rotate the carousel to the slot address specified by the operator. At the same time, sequencer 212 will cause an X latch 216, a Y latch 218 and an extractor latch 220 to be loaded with signals identifying the proper position of the extractor head with respect to the upper and lower carousels.

Carousel control 214 provides a signal which informs sequencer 212 that the appropriate slot position is adjacent the extractor head. Sequencer 212 then supplies appropriate control signals to the extractor latch 220 in order to cause the extractor head 16 to be inserted into the carousel assembly. The selected microfiche is therefore received within the slot 82 of the extractor head 16. After an appropriate delay to insure that this has taken place, sequencer 212 will supply a control signal to the extractor head vacuum valve 214 to cause a vacuum to be applied to the extractor head. The selected microfiche will thus be held within slot 82. Sequencer 212 then causes extractor latch 220 to be loaded with a new signal to cause the extractor head 16, and thus the microfiche contained therein, to be extracted from the carousel assembly.

After another appropriate delay, sequencer 212 will cause the X latch 216 and Y latch 218 to be loaded with the address signals supplied by the operator via keyboard 210. The binary words thus loaded within the X and Y latches 216 and 218 are directed to the X and Y valves in order to actuate the appropriate linear actuators and thus position the desired image at the optical axis of the reader assembly 20.

Similarly, when the operator provides a release signal via keyboard 210, sequencer 212 will apply appropriate signals to the remainder of the circuit in order to reinsert the microfiche back into its associated slot location within the carousel assembly 12.

Figure 8:
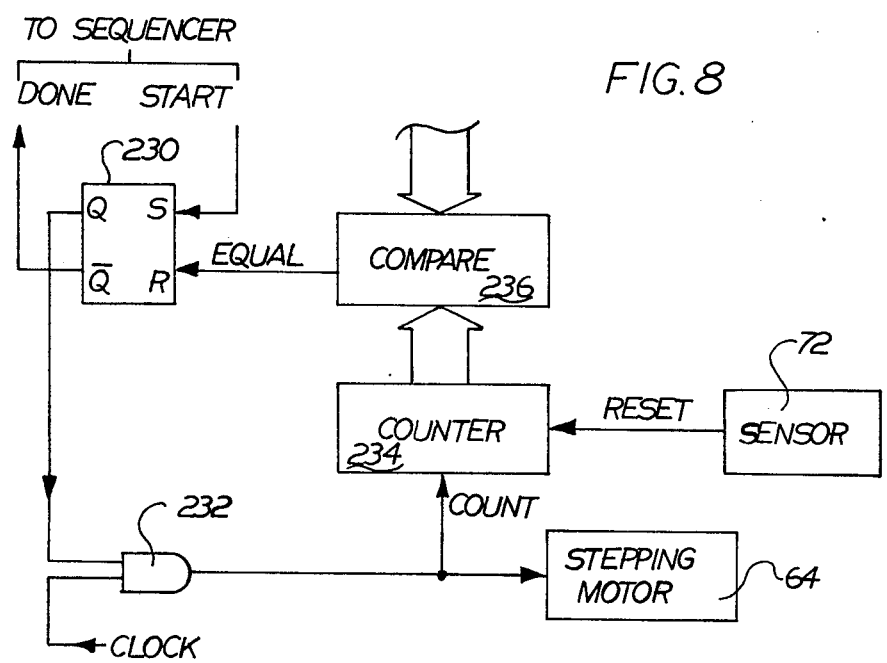

FIG. 8 provides a more detailed illustration of the carousel control circuit 214 of FIG. 7. In this figure, it can be seen that a set-reset flip-flop 230 will be switched to a "set" condition whenever a start command is issued by sequencer 212. This will cause the Q output of flip-flop 230 to go to high logic level, enabling a clock gate 232. This clock gate, when thus enabled, will permit clock signals from a clock source (not shown) to pass into stepping motor 34, thus rotating the carousel one slot position for each clock pulse. A counter 234 also responds to these count pulses so that the count contained within counter 234 will reflect the present position of the carousel assembly 12. A comparator 236 compares the output from counter 234, indicating the present position of the carousel, with the address from address latch 213, indicating the desired position of the carousel. When these two numbers are equal, comparator 236 will provide a high logic level on the output line thereof. This produces the resetting of flip-flop 230. The supply of clock pulses to the stepping motor through gate 232 is thus disabled, stopping the carousel at the appropriate position. The output of flip-flop 230 is returned to the sequencer 212 in order to indicate the status of the carousel control logic.

As stated previously, a sensor 72 is included in order to uniquely identify a single rotational position of the carousels 22 and 24. When this detector senses the passage of the reference mark on the encoder wheel 70, a reset signal is supplied to the counter 234, causing the counter to be reset to the value corresponding to the position of the reference mark. Thus, each time the reference mark passes the sensor 72, the counter 234 will be recalibrated. This insures the integrity of the carousel positioning system.

A system has thus been described which operates to store and selectively retrieve any a large number of planar film records. Although, in the embodiment which has been described, these planar film records have been microfiche containing images at particular page positions thereon, it will be appreciated that the invention has application to any type of planar film records, whether they contain holograms, digital data, or any other desired form of information. Therefore, although the invention has been described with respect to a preferred embodiment, it will be appreciated that various rearrangements and alterations of parts may be made without departing from spirit and scope of the invention, as defined in the appended claims.

What is claimed is:

1. Apparatus for storing and randomly accessing a plurality of planar film records, comprising record storing means for storing said planar film records in a close, side by side relationship in corresponding known locations in said record storing means, including location defining means for confining said film records to specific locations by restraining two opposing edges of said film record from movement in at least a direction normal to the plane of said film record, film record retrieval means for retrieving a selected film record from said record storing means by grasping said selected film record by an edge other than said two opposing edges and then withdrawing said film record from said film storing means, and control means for causing said retrieval means to retrieve a selected film record from said record storing means by causing said retrieval means to retrieve the film record from the location in said record storing means in which said film record is known to be stored, wherein said record storing means further includes backstop means for providing a backstop against which said planar film records may be forced by said retrieval means during the retrieval of a selected film record, and wherein said retrieval means includes means for forcing said selected film record against said backstop means during said retrieval of said selected film record, so as to thereby cause said planar film record to flex slightly between said retrieval means and said backstop means, thereby forcing said grasped edge of said selected film record into a known alignment with said film retrieval means.

2. Apparatus for storing and randomly accessing a plurality of planar film records, comprising record storing means for storing said planar film records in a close, side by side relationship in corresponding known locations in said record storing means, including location defining means for confining said film records to specific locations by restraining two opposing edges of said film record from movement in at least a direction normal to the plane of said film record, film record retrieval means for retrieving a selected film record from said record storing means by grasping said selected film record by an edge other than said two opposing edges and then withdrawing said film record from said film storing means, means for providing an indication as to which of said locations of said recording storing means is adjacent said film record retrieval means, and control means responsive to said indication for causing said retrieval means to retrieve a selected film record from said record storing means by causing said retrieval means to retrieve the film record from the location in said record storing means in which said film record is known to be stored, wherein said film record retrieval means includes an extractor head for extracting said selected film record from said record storing means, X positioning means for positioning said extractor head at predetermined positions in a first dimension, and Y positioning means for positioning said extractor head at predetermined positions in a second dimension, said X and Y positioning means each including a plurality of linear actuators each having extended and nonextended states and providing a corresponding, predetermined amount of travel in the corresponding dimension when moved between said states, with the entire positioning of said extractor head in said first and second dimensions being accomplished by controlling the states of said linear actuators.

3. Apparatus for accessing a plurality of planar film records, comprising record storing means for storing said planar film records in a close, side by side relationship in corresponding known locations in said record storing means, including location defining means for comfining said film records to specific locations by restraining two opposing edges of said film record from movement in at least a direction normal to the plane of said film record, film record retrieval means for retrieving a selected film record from said record storing means by grasping said selected film record by an edge other than said two opposing edges and then withdrawing said film record from said film storing means, and control means for causing said retrieval means to retrieve a selected film record from said record storing means by causing said retrieval means to retrieve the film record from the location in said record storing means in which said film record is known to be stored, wherein said film records are stored so close to one another in said record storing means that film records adjacent said selected film record will interfere with the retrieval of said selected film record by said film record retrieval means, wherein said film record retrieval means includes means for slightly flexing said adjacent film records away from said selected film record so as to not interfere with the operation of said film record retrieval means, and wherein said film record retrieval means includes film extractor means having a slot formed therein, said slot being adapted to receive said edge of said selected film record, with the portions of said extractor head on either side of said slot each being beveled so as to both guide said selected film record into said slot and to flex adjacent film records away from said slot.

4. Apparatus as set forth in claim 3, wherein said film extractor means includes passages leading to said slot, and wherein said selected film record is grasped by applying a vacuum to said passages so that air pressure firmly holds said film record within said slot.

5. Apparatus for storing and randomly accessing a plurality of planar film records, comprising:
at least one carousel for storing said planar film records in a close, side by side relationship, said carousel having two generally circular slot plates, supported one above the other in a parallel, coaxial relationship, with the facing sides of said slot plates having a plurality of radially extending slots therein, with corresponding slots of the two slot plates being aligned so that opposing edges of a planar film record may be received within said corresponding slots and thus restrained from movement in the direction normal to the plane of said film record, whereby said planar film records are held in specific locations in said carousel defined by the locations of the slots in which said film records are held,
film record retrieval means for retrieving a selected film record from said at least one carousel by grasping said selected film record by the edge of said planar film record which is adjacent the perimeter of said carousel and pulling said film record, by said edge, from said carousel, and
control means for controlling said apparatus to retrieve a selected film record from said at least one carousel by causing said carousel to rotate so that the location at which said film record is known to be stored is adjacent said retrieval means, and for then causing said retrieval means to retrieve said film record from said location, whereby said film records are retrieved by reference to their locations in said at least one carousel, rather than by reference to any data contained on said film record, wherein said at least one carousel includes a generally circular stop member positioned between said two slot plates and coaxial therewith, said stop member providing a backstop against which said planar film records may be forced during the retrieval of a selected film record, and wherein said retrieval means includes means for forcing said selected film record against said circular stop member during said retrieval of said selected film record so as to thereby cause said planar film record to flex slightly between said retrieval means and said stop member, thereby forcing said grasped edge of said selected film record into a known alignment with said retrieval means.

6. Apparatus for storing and selectively accessing a plurality of planar film records, comprising:
film record storing means for storing said plurality of planar film records at specific locations therein;
film record reading means for reading information from a film record retrieved from said record storing means, said reading means having an optical axis defining the location in space at which said reading means operates to read said information;
film record retrieval means for retrieving a selected film record from said film storing means and for positioning said film record relative to said optical axis, including film record grasping means for grasping said selected film record, X positioning means for positioning said grasping means at predetermined positions in a first dimension, and Y positioning means for positioning said grasping means at predetermined positions in a second dimension, said X and Y positioning means each including a plurality of linear actuators, each actuator having extended and nonextended states and providing a corresponding, predetermined amount of travel in the corresponding dimension when moved between said states, with the entire positioning of said grasping means in said first and second dimensions being accomplished by controlling the states of said linear actuators, said X and Y positioning means being controllable to position said film grasping means for grasping and withdrawing a selected planar film record from said film record storing means; and
control means for causing said X and Y positioning means to position said film grasping means adjacent a selected planar film record in said record storing means, for causing said film grasping means to grasp said selected planar film record, and for then causing said X and Y positioning means to withdraw said selected film record from said film storing means and to position said record relative to said optical axis.

7. Apparatus as set forth in claim 6, wherein each of said X and Y positioning means has first and second end members, with said linear actuators being coupled in series between said end members and being operative to control the incremental distance between said end members with one of said end members of each positioning means being coupled to said grasping means, and the others of said end members being fixed at positions which may be adjusted to account for position offset in the positioning of said grasping means with respect to the remainder of said apparatus.

8. Apparatus as set forth in claim 6, wherein said linear actuators each comprises a dual action pneumatic actuator.

9. Apparatus as set forth in claim 6, wherein said plurality of film records each contais a plurality of descrete images located in ordered rows and columns thereon, said retrieval means operating to position a selected one of said images on said optical axis, and wherein said X positioning means includes linear actuators for positioning a selected column of images on said optical axis, and said Y positioning means includes linear actuators for positioning a selected row of images on said optical axis, with each of these linear actuators being structured to provide an incremental travel corresponding to an integral number times the distance from the center of one image to the next, whereby the image in a selected row and column of said film record may be positioned at the optical axis by operating appropriate ones of said actuators.

10. Apparatus as set forth in claim 6, wherein said film records comprise microfiche.

* * * * *